United States Patent
Baurens et al.

(10) Patent No.: US 7,147,960 B2
(45) Date of Patent: Dec. 12, 2006

(54) CONDUCTIVE COMPOSITE MATERIAL AND ELECTRODE FOR FUEL CELL USING SAID MATERIAL FORMED BY THERMO-COMPRESSION

(75) Inventors: Pierre Baurens, Coublevie (FR); Eric Bourgeoisat, Joue les Tours (FR); Franck Jousse, Tours (FR); Jean-Félix Salas, Montbazon (FR)

(73) Assignee: Commissariat a l'Energie Atomique (FR)

( * ) Notice: Subject to any disclaimer, the term of this patent is extended or adjusted under 35 U.S.C. 154(b) by 412 days.

(21) Appl. No.: 10/333,809

(22) PCT Filed: Jul. 23, 2001

(86) PCT No.: PCT/FR01/02392

§ 371 (c)(1), (2), (4) Date: Jan. 23, 2003

(87) PCT Pub. No.: WO02/09219

PCT Pub. Date: Jan. 31, 2002

(65) Prior Publication Data

US 2004/0038116 A1  Feb. 26, 2004

(51) Int. Cl.
*H01M 4/86* (2006.01)
*H01M 4/90* (2006.01)
*H01M 4/96* (2006.01)
*B32B 9/00* (2006.01)

(52) U.S. Cl. ............... 429/42; 429/39; 428/408
(58) Field of Classification Search ............... None
See application file for complete search history.

(56) References Cited

U.S. PATENT DOCUMENTS 3,404,061 A * 10/1968 Bochman et al. ......... 428/143

(Continued)

FOREIGN PATENT DOCUMENTS

EP  0 268 397 A1  5/1988

(Continued)

*Primary Examiner*—Patrick Joseph Ryan
*Assistant Examiner*—Julian Mercado
(74) *Attorney, Agent, or Firm*—Thelen Reid & Priest LLP

(57) ABSTRACT

This invention relates to a composite conducting material comprised of a mixture of flake graphite and thermoplastic polymer powder sintered at high pressure that can be used for realizing a fuel cell electrode. The mixture comprises a first type of flake graphite composed of flakes having a granulometry between 10 and 100 μm and/or a second type of flake graphite comprised of clusters of particles of graphite linked and superimposed upon each other in such a fashion that their principal planes are parallel to each other; said clusters having a planar anisotropy and having between 10 μm and 1 mm in length and between 5 and 50 μm in thickness, the mixture also comprising a thermoplastic polymer powder having a granulometry between 10 and 200 μm, the flakes and/or the clusters having their principal planes parallel to each other.

13 Claims, 1 Drawing Sheet

U.S. PATENT DOCUMENTS

| | | | | |
|---|---|---|---|---|
| 4,366,205 A | | 12/1982 | Tsukagoshi et al. | 428/338 |
| 4,414,142 A | | 11/1983 | Vogel et al. | 252/506 |
| 4,680,139 A | | 7/1987 | Williams et al. | 252/511 |
| 4,704,231 A | | 11/1987 | Chung | 252/511 |
| 4,988,583 A | * | 1/1991 | Watkins et al. | 429/30 |
| 5,286,415 A | * | 2/1994 | Buckley et al. | 252/502 |
| 5,558,955 A | * | 9/1996 | Breault et al. | 429/38 |
| 5,804,116 A | | 9/1998 | Schmid et al. | 264/104 |
| 6,037,074 A | * | 3/2000 | Mercuri et al. | 429/34 |
| 6,106,263 A | | 8/2000 | Schmid et al. | 425/144 |
| 6,413,671 B1 | * | 7/2002 | Mercuri et al. | 429/231.8 |
| 6,803,150 B1 | | 10/2004 | Iriyama et al. | 429/231.8 |

FOREIGN PATENT DOCUMENTS

| | | | |
|---|---|---|---|
| EP | 0268397 | | 5/1988 |
| EP | 0 415 733 A2 | | 3/1991 |
| EP | 0415733 | | 3/1991 |
| EP | 0 527 046 A2 | * | 2/1993 |
| EP | 0 774 337 A1 | | 5/1997 |
| EP | 0784352 | | 7/1997 |
| EP | 0 805 463 A1 | | 11/1997 |
| EP | 0805463 | | 11/1997 |
| EP | 0 935 303 A1 | | 8/1999 |
| EP | 0935303 | | 8/1999 |
| EP | 1011164 | | 6/2000 |
| EP | 1059348 | | 12/2000 |
| GB | 928351 | | 6/1963 |
| JP | 11-354136 | | 12/1999 |
| JP | 2000-077081 | | 3/2000 |
| WO | WO 00/13245 | | 3/2000 |
| WO | WO 00/25372 | | 5/2000 |
| WO | WO 00/30202 | | 5/2000 |

* cited by examiner

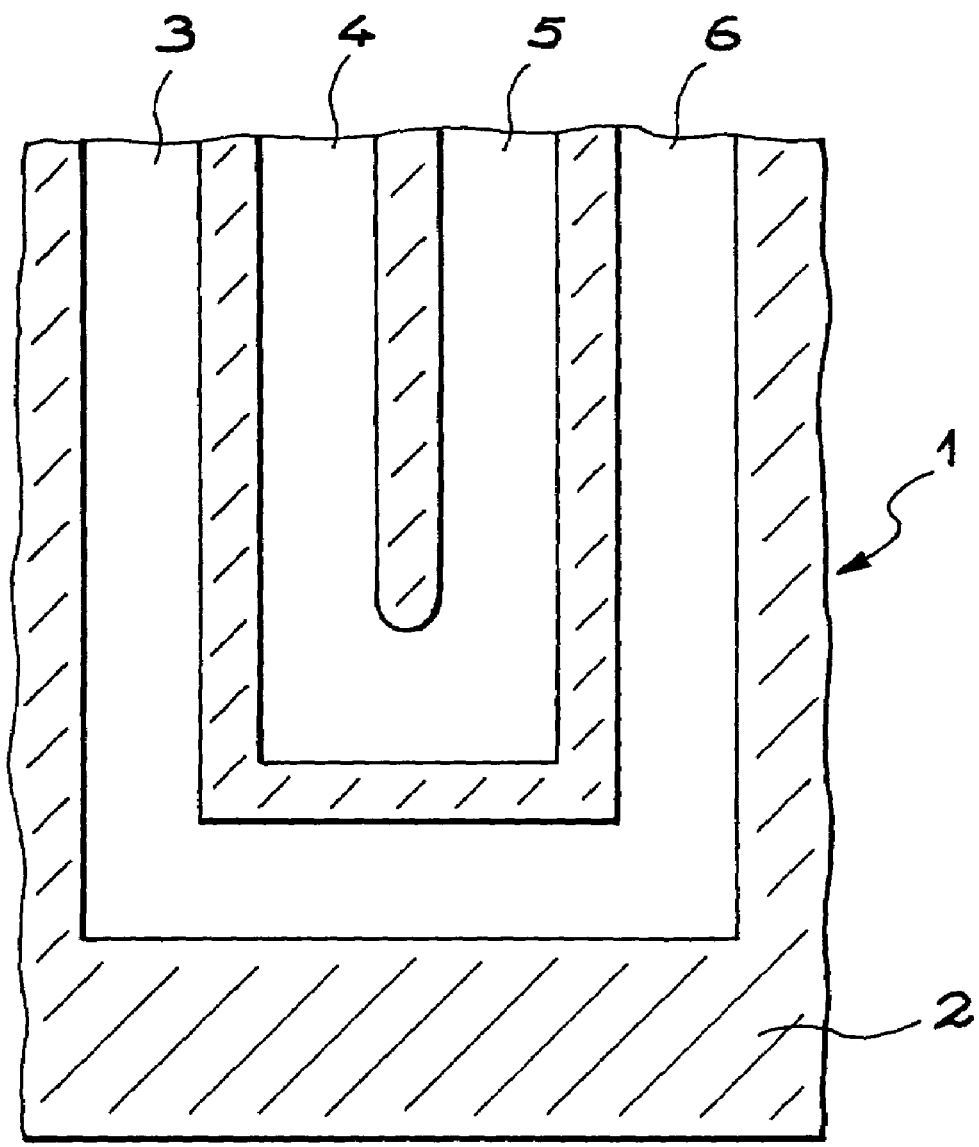

CONDUCTIVE COMPOSITE MATERIAL AND ELECTRODE FOR FUEL CELL USING SAID MATERIAL FORMED BY THERMO-COMPRESSION

CROSS-REFERENCE TO RELATED APPLICATION

This application is based on International Patent Application No. PCT/FR01/02392, entitled "Composite Conducting Material And Electrode For A Fuel Cell Using Said Material Formed By Thermo-Compression" by Pierre Baurens, Eric Bourgeoisat, Franck Jousse and Jean-Felix Salas, which claims priority of French application no. 00/09666, filed on Jul. 24, 2000, and which was not published in English. This Application is related to co-pending U.S. patent application Ser. No. 10/333,940, entitled "Conducting Composite Material And Electrode For Fuel Cell Using This Conducting Composite Material" by Franck Jousse, Jean-Felix Salas, Didier Marsacq and Philippe Mazabraud, filed on the same date and assigned to the same assignee, which is based on International Patent Application No. PCT/FR01/02393 which claims priority of French application no. 00/09667, filed on Jul. 24, 2000, and which was not published in English.

FIELD OF THE INVENTION

The present invention relates to a composite conducting material and a method for manufacturing same. It also relates to an electrode for a fuel cell and a method for manufacturing such an electrode.

PRIOR ART

Electrically conducting composite materials are comprised of electrically conducting particles dispersed in an organic matrix. The threshold of electrical conduction or the percolation threshold (the transition from the insulating state to the conducting state) is attained when the conducting particles form a grid of conduction paths connected over the entire volume of composite material.

The conducting particles can be metallic, which has the advantage of good electrical conductivity. They exhibit the drawback, however, of having an elevated density and being sensitive to the chemical environment of the cell. Non-metallic conducting particles are particularly interesting because of their low density and their chemical resistance. Non-metallic conducting materials most used are the carbon-based powdered products such as the carbon black powders or graphite and carbon filaments.

Depending on the morphology of the particles (ratio of shape, specific surface), the percolation threshold is achieved for filler ratios of several volumetric % for fibers and 20% to 30% by volume for spheres. These materials typically enable obtaining conductivities in the volume of material of the order of $10^{-5}$ to $10^{-1}$ S/cm. Thus it has been found bound that the conductivity of composite materials is much lower to that of materials used (of the order of 1,000 S/cm for graphite) although the ratios of material are greater than the threshold of percolation. This effect is explained by the significant resistances of contact between adjacent particles. These resistances are connected on the one hand with the low contact surface between two particles (constriction resistance) and on the other hand with the formation of an insulating film at the surface of the materials at the time of their dispersion in the organic binder (resistance tunnel).

Constriction resistance is defined by the relationship $R_{cr} = \rho_i/d$ where $\rho_i$ represents the resistivity of the material and d is the diameter of the contact surface between the grains. The covering surface of the materials is controlled by their geometry as well as by their viscoelastic properties; in other words, their capacity to deform under stress.

The resistance tunnel is associated with any insulating film able to cover the surface of the particles. It can relate to absorbed tensioactive substances or more simply the organic matrix that covers the materials once they are dispersed. In this configuration, the mechanism of conduction between conductor grains is no longer ohmic but is effected by electronic leaps between insulated particles. By virtue of the weak electronic transport properties of the polymers, the local electrical field between conductor grains requires, to reach the circulation of an electrical current in the totality of its conductor deposits comprised of the materials must be very considerable. Practically, the local electrical field is never sufficient to enable an electronic leap between each particle connected but insulated by a polymer film. Only a small portion of the conductor paths is solicited and actually participates in the current circulation. The resistance tunnel is defined by the relationship $R_t = \rho_t/a$ where $\rho_t$ represents the resistance tunnel associated with the thickness of the film and the electrical properties of the insulating organic matrix and where a quantifies the contact air.

The resistance to the interface between two particles is the sum of the constriction and tunnel resistances. In a great majority of cases, the tunnel resistance governs the macroscopic conductivity of the heterogeneous media. In fact, the tunnel resistance goes from $10^{-8}$ to $10^3$ Ω.cm when the thickness of the insulating film covering the conducting particles in contact varies from 0.5 to 12 nm. This insulation thickness of several nanometers corresponds classically to the layer of polymer matrix adsorbed to the surface of the materials at the time of dispersion.

These polymer membrane fuel cells currently developed require bipolar separator plates. In a complete assembly comprised of a succession of electrochemical cells, these bipolar plates have the function of separating the anode and cathode electrodes, enabling distribution of hydrogen and oxygen gas, respectively, to the cathode and to the anode, collecting the electrical current produced and, in certain cases, enabling cooling of the cell.

The materials comprising these bipolar separator plaques must fulfill the following criteria:
  impermeability to hydrogen and oxygen gas;
  high mechanical resistance;
  chemical resistance in the acid environment of the electrochemical cell; any degradation of the bipolar plate material must not result in contamination of the electrochemical cell.

These materials must be in the form for constituting plates at whose surfaces gas distribution channels are disposed. The techniques for implementing and the costs of the bipolar plates must be compatible with the constraints associated with automobile manufacturing.

Currently, bipolar plates are manufactured using machined graphite plates or pressed non-corroding metal plates (inox steel or aluminum covered with titanium). The solutions using machined graphite are expensive and less compatible with large scale production. The solutions using metallic particles result in relatively heavy plates.

One route to improvement is manufacturing bipolar separator plates directly by molding conducting composites.

The general aforesaid principles suggest that the realization of highly conducting composite materials requires the use by classical techniques of transformation of the polymers, the highly charged materials into conducting elements in order on the one hand to increase the number of contacts between conducting particles and on the other hand to increase the contact surfaces between adjacent elements.

These principles have been used in the context of developing elements having reduced weights per fuel cell and have led to the filing of patent applications EP-A-0 774 337, WO-A-96/12309, EP-A-0 933 825 and WO-A-98/53514.

Application EP-A-0 774 337 discloses a method for manufacturing shaped bodies by extrusion molding of plastic material with filler contents of more than 50% by volume (preferably between 65 and 90% by volume) of conducting elements (flake graphite or not, conducting fibers, etc.). At the start, the mixture of the constituents is done in a mixer then, after having been crushed or granulated the mixture is extruded in the form of a plate or a tube. The composite materials obtained are produced using any type of commercially available conducting filler.

WO-A-96/12309 discloses the realization of a stack for fuel cells using a conducting composite material obtained by a thermocompressed mixture of flake graphite and fluorinated resin (PTFE). The composite material obtained by this method is non-porous and can be molded directly by compression. The conducting composite material and the type of filler are not optimized to control impermeability to gases obtained and cooling of the cell. It is necessary to provide a barrier material on the surface for sealing of the assembly.

EP-A-0 933 825 discloses a method for manufacturing repair plates for fuel cells based on a thermally setting bonder (phenolic resin and epoxy resin) with or without flake graphite. The mixture is thermally pressed in a mold having the geometry of the separator plates to be created. The porosity and thus in initial approximation the impermeability to gas is optimized by favoring the evacuation of water and the gases formed at the time of reticulation. However, an insulating layer of resin covers the surface of the plates and must be removed by stripping.

WO-A-98/53514 discloses a method for manufacturing bipolar separator plates by thermocompression, said plates containing from 50 to 95% of conducting material made of different thermoplastics. The conducting material can be graphite, carbon black and carbon filaments. The impermeability problem to gas is met by the addition of a hydrophilic agent favoring the migration of water into the pores of the material. This configuration favors above all the evacuation of the water produced in the cell and enables cooling of the cell.

SUMMARY OF THE INVENTION

The present invention has been conceived in order to eliminate the aforesaid drawbacks of conducting composite materials. It enables obtaining light materials with very low surface electrical resistance and thermal conductivity optimized in the direction parallel to the surface.

A first object of the invention consists of a conducting composite material comprised of a high-pressure sintered mixture of flake graphite and thermoplastic polymer powder, said mixture comprising a first type of flake graphite composed of flakes having a granulometry between 10 and 100 µm and/or a second type of flake graphite comprised of clusters of bonded graphite particles and superimposed on each other in such a fashion that their principal planes are parallel to each other; said clusters having a planar anisotropy and having between 10 µm and 1 mm in length and between 5 to 50 µm in thickness, the mixture also comprising a thermoplastic polymer powder having a granulometry between 10 and 200 µm, the flakes and/or the cluster having the principal planes running parallel to each other.

Preferably, the first type of flake graphite is comprised of flakes having a granulometry of between 20 and 50 µm.

The clusters of the second type of flake graphite can be comprised of particles of 5 to 20 µm in length and 0.1 to 5 µm in thickness.

Preferably, the thermoplastic polymer powder has a granulometry less than 50 µm. This polymer can be of the fluorinated type, such as PVDF.

A second object of the invention relates to a method for manufacturing a conducting composite material, characterized in that it comprises:

obtaining a mixture comprising a thermoplastic polymer powder having a granulometry between 10 and 200 µm, a first type of flake graphite comprised of flakes having a granulometry of between 10 and 100 µm and/or a second type of flake graphite comprised of clusters of bonded particles of graphite and superimposed on each other in such a fashion that their principal planes are parallel to each other, said clusters having a planar anisotropy and having between 10 µm and 1 mm in length and 5 and 50 µm thickness;

forming of the conducting material by sintering at high pressure of the mixture in order that the principal planes of the flakes and/or the clusters are parallel to each other.

The second type of flake graphite can be obtained by crushing in the solid phase or in the solvent phase, followed by screening, of graphite sheets, the so-called graphite sheets being comprised of particles of graphite whose principal planes are parallel to the plane of said sheet. This crushing of graphite sheets can consist in crushing of graphite sheets manufactured by calendering and/or laminating of natural or expanded graphite.

The second type of flake graphite can also be obtained by crushing in the solid phase or the liquid phase of a mass of graphite obtained by compression, crushing being followed by screening.

The second type of flake graphite can then be obtained by means of the following steps:

dispersion of platelets of exfoliated graphite or graphite obtained by grinding a sheet of graphite in an organic solvent until obtaining a uniform paste;

drying of the uniform paste so obtained;

crushing of the dried paste for obtaining clusters of graphite particles;

screening of the clusters of graphite particles.

The drying step can be realized by filtration of the solvent followed by degassing in a container under vacuum.

Advantageously, the forming of the conducting composite material is done in a mold. Sintering can be done at a pressure between 0.25 and 1 ton/cm$^2$.

According to one particular method, sintering is done according to the following cycle:

the mixture is brought to a temperature of slightly below the melting temperature of the thermoplastic polymer;

the mixture is gradually compressed at the required pressure for sintering;

the compressed mixture is brought to a temperature slightly above the melting point of the thermoplastic polymer for a determined period of time;

the compressed mixture is brought down to a temperature lower than the melting point of the thermoplastic polymer for a determined period of time;

the sintered mixture is gradually brought to room temperature and to room pressure.

A third object of the invention is comprised of an electrode for a fuel cell comprising the means enabling circulation of a gaseous fluid to the surface of at least one of its main surfaces, obtained by sintering at high pressure of a mixture of flake graphite and thermoplastic polymer powder, the mixture comprising a first type of flake graphite comprised of flakes having a granulometry of between 10 and 100 μm and/or a second type of flake graphite comprised of clusters of particles of bonded graphite and superimposed with each other in such a fashion that their principal planes are parallel to each other, said clusters having a planar anisotropy and being between 10 μm and 1 mm in length and 5 and 50 μm in thickness, the mixture also comprising a thermoplastic polymer powder having a granulometry of between 10 and 200 μm, the flakes and/or clusters having their principal planes running parallel to each other and to the principal surfaces of the electrode.

For this electrode, the first type of flake graphite can be comprised of flakes having a granulometry of between 20 and 50 μm. The clusters of the second type of flake graphite are advantageously comprised of particles of 5 to 20 μm in length and 0.1 to 5 μm in thickness. The thermoplastic polymer powder can have a granulometry of less than 50 μm. The thermoplastic polymer is advantageously of the fluorinated type, for example PVDF.

Preferably the means enabling the circulation of a gaseous fluid comprise channels.

A fourth object of the invention relates to a method for manufacturing an electrode for a fuel cell comprising means enabling the circulation of a gaseous fluid at the surface of at least one of its principal surfaces, characterized in that it comprises:

obtaining a mixture comprising a thermoplastic polymer powder having a granulometry between 10 and 200 μm, a first type of flake graphite comprised of flakes having a granulometry of between 10 and 100 μm and/or a second type of flake graphite comprising clusters of bonded graphite particles and superimposed with each other in such a fashion that their principal-planes are parallel to each other, these clusters having a planar anisotropy and having between 10 μm and 1 mm in length and between 5 and 50 μm in thickness, molding in a mold of said electrode by sintering the mixture at high pressure so that the principal planes of the flakes and/or the clusters are parallel to each other and parallel to the principal surfaces of the electrode, said means enabling the circulation of a gaseous fluid comprised at the time of said high-pressure sintering.

According to one embodiment, the second type of flake graphite is obtained by crushing in the solid or solvent phase, followed by screening, of graphite sheets, a so-called graphite sheet being comprised of particles of graphite whose principal planes are parallel to the plane of said sheet. Crushing of the graphite sheets can consist in crushing the graphite sheets manufactured by calendering and/or lamination of natural or expanded graphite.

According to another embodiment, the second type of flake graphite is obtained by crushing, in the solid or liquid phase, a mass of graphite obtained by compression, said crushing being then followed by screening.

According to yet another embodiment, the second type of flake graphite is obtained by means of the following steps:

dispersion of platelets of exfoliated graphite or graphite obtained by grinding a sheet of graphite in an organic solvent until a uniform paste is obtained;

drying of the uniform paste so obtained;

crushing of the dried paste in order to obtain clusters of graphite particles;

screening of the clusters of graphite particles.

The drying stage can be done by filtration of the solvent followed by degassing in a container under vacuum.

Sintering of the electrode can be done at a pressure of between 0.25 and 1 ton/cm$^2$.

According to a particular embodiment, sintering of the electrode is done according to the following cycle:

the mixture is brought to a temperature of slightly below the melting temperature of the thermoplastic polymer;

the mixture is gradually compressed at the required pressure for sintering;

the compressed mixture is brought to a temperature slightly above the melting point of the thermoplastic polymer for a determined period of time;

the compressed mixture is brought down to a temperature lower than the melting point of the thermoplastic polymer for a determined period of time;

the sintered mixture is gradually brought to room temperature and to room pressure.

BRIEF DESCRIPTION OF THE DRAWING

The invention will be more completely understood and other advantages and particularities will become apparent when reading the following description provided as a non-limiting example, together with the annexed FIGURE that represents a partial view of one of the main surfaces of a fuel cell electrode according to the invention.

DETAILED DESCRIPTION OF AN EMBODIMENT OF THE INVENTION

Following the description will lead to the realization of an electrode for a fuel cell using a mixture containing a first type of flake graphite and a second type of flake graphite.

The first type of graphite has a granulometry between 10 and 100 μm. Preferably, the mean granulometry is 23 μm. It specific surface is between 6 and 25 m$^2$/g and its conductivity is of the order of 1,000 S/cm. This type of graphite is commercially available.

The second type of graphite can be comprised of particles originating from sheets of graphite previously produced by calendering of expanded graphite. The density of the sheets is from 1.1. Permeability to helium of such sheets is 10$^5$ cm$^2$/s/atm. The graphite sheets are ground in a solvent or in solid phase in order to obtain clusters of graphite flakes; said clusters being between 10 μm and 1 mm in length, with a majority of clusters between 100 and 300 μm in length, and 5 and 50 μm in thickness.

The second type of graphite can also be obtained using platelets of exfoliated graphite dispersed in an organic solvent. The ratio of graphite in the solvent is between 10 and 50% by volume suing the dimensional characteristics of the graphite (low rate of dilution for graphites having large specific surface, higher rates for those platelets of several m$^2$/g of specific surface) in order to obtain a low viscosity paste. This mixture is stirred until obtaining a uniform dispersion. The past is then dried by filtration of the solvent then by degassing in a container under vacuum. These operation can advantageously enable recovery of the solvent. The dry paste so obtained is comprised of raw clusters of graphite platelets; the platelets being largely overlapping. In an cluster the platelets are superimposed, in line and their principal planes are generally parallel. This paste is then crushed and screened in order to obtain graphite clusters having a granulometry of between 100 μm and 1 mm.

The second type of graphite can be obtained by grinding solid graphite material. The grinding is done in the solid or liquid phase. The powder obtained is screened to the granulometry specified for the second type of graphite. It is preferable to use as the starting material graphite masses realized by compression in order to have an anisotropic starting structure.

The mixture also comprises a thermoplastic polymer powder having a granulometry of between 10 and 200 μm, preferably a granulometry of less than 50 μm. PVDF appears to be the polymer of greatest interest for the invention.

The mixture can comprise, by weight, as much graphite of the first type as graphite of the second type. The ratio of graphite material can be very high, between 70 and 85% by volume.

The constituents of the mixture are previously dried then mixed. The formulation is homogenized on a vibrating plate.

Shaping of the composite conducting material is done by means of a mold in which the mixture is sintered at high pressure.

The mixture contained in the mold is brought to a temperature slightly below the melting point of the polymer (for example to 20° C. lower than the melting point). It is then gradually compressed up to a pressure of between 0.25 and 1 ton/cm². The temperature of the mixture is then increased to slightly above the melting point of the polymer (for example 20° C. higher) over 10 minutes. The mixture is then cooled under pressure to a temperature of 40° C. lower than the melting point of the polymer. The sintered mixture is then gradually brought to room temperature and ambient pressure.

The pressure placed on the mixture is uniaxial. The material obtained has a very anisotropic structure; the graphite flakes are oriented in a direction perpendicular to the direction of pressing and the sintering operation does not involve transfer of material into the mold.

This method enables, in particular, realizing gas feed channels in the fuel cell electrodes.

The annexed FIGURE shows, in part, one of the principal surfaces of a fuel cell electrode according to the present invention. The principal face 2 of the electrode (or bipolar plate) 1 comprises grooves 3, 4, 5 and 6 interconnected in such a fashion as to enable circulation of a gaseous fluid on the surface 2 of the electrode.

The conducting composite material according to the present invention has a stratified structure, the graphite flakes or clusters having their principal plane parallel to the principal surfaces of the material in the form of the electrode. An anisotropic conductivity flows therein. This conductivity can vary from 1 to 30 S/cm in a direction transverse to the plane of the electrode (the direction of compaction) as a function of the ratio of material and the pressure at the time of sintering. In a direction parallel to the plane of the electrode (that is, a direction perpendicular to the direction of compaction), conductivity can vary between 50 and 200 S/cm.

An electrode conceived according to the present invention has a thermal conductivity that is also anisotropic. It is clearly greater in a direction parallel to the surface than in a transverse direction. In the case of an electrode for a fuel cell, this enables optimizing cooling of the cell.

The first type of graphite and the second type of graphite have good superficial conductivity and favor cooling of an electrode. The second type of graphite enables obtaining a very good gas impermeability, namely to helium and hydrogen. Gas permeability of the second type of graphite is less than that of the prior art graphite particles. Moreover, larger dimensions of the clusters comprising the second type of graphite (several hundreds of μm in length) increase the tortuosity of the composite material.

The table below compares different composite materials in the form of plates; one plate of pyrolized graphite, a composite plate on the basis of the first type of graphite and a composite graphite on the basis of the second type of graphite.

| Material | Helium Permeability ($m^3 \cdot m/m^2/Pa/s$) |
|---|---|
| Pyrolized graphite plate | $10^{-17}$ |
| Composite plate based on the first graphite type | $10^{-15}$ |
| Composite plate based on the second graphite type | $10^{-18}$ |

The invention claimed is:

1. A composite conducting material comprised of a mixture of flake graphite and thermoplastic polymer powder sintered under a pressure, the mixture comprising a first type of flake graphite comprised of flakes having a granulometry of between 10 and 100 μm and a second type of flake graphite comprising clusters of bonded graphite particles and superimposed on each other in such a fashion that their principal planes are parallel to each other; the clusters exhibiting a planar anisotropy and being between 10 μm and 1 mm in length and being between 5 and 50 μm in thickness, the mixture also comprising a thermoplastic polymer powder having a granulometry of between 10 and 200 μm, at least one of the flakes and the clusters having their principal planes parallel to each other.

2. A composite conducting material according to claim 1, wherein the first type of flake graphite is comprised of flakes having a granulometry of between 20 and 50 μm.

3. A composite conducting material according to claim 1, wherein the clusters of the second type of flake graphite are comprised of particles of 5 to 20 μm in length and 0.1 to 5 μm in thickness.

4. A composite conducting material according to claim 1, wherein the thermoplastic polymer powder has a granulometry or less than 50 μm.

5. A composite conducting material according to claim 1, wherein the thermoplastic polymer is a fluorinated type.

6. A composite conducting material according to claim 5, wherein the thermoplastic polymer is PVDF.

7. An electrode for a fuel cell, comprising: means for enabling the circulation of a gaseous fluid at a surface of at least one principal surface of the electrode, obtained by sintering a mixture of flake graphite and a thermoplastic polymer powder under a pressure, the mixture comprising a first type of flake graphite comprising flakes having a granulometry of between 10 and 100 μm and a second type of flake graphite comprising clusters of bonded graphite particles and superimposed with each other in such a fashion that their principal planes are parallel to each other, said clusters having a planar anisotropy and being between 10 μm and 1 mm in length and between 5 and 50 μm in thickness; the mixture also comprising a thermoplastic polymer powder having a granulometry of between 10 and 200 μm, at least one of the flakes and the clusters having their principal planes parallel to each other and parallel to the principal surface of the electrode.

8. An electrode for a fuel cell according to claim 7, wherein the first type of flake graphite is comprised of flakes having a granulometry of between 20 and 50 μm.

9. An electrode for a fuel cell according to claim 7, wherein the clusters of the second type of flake graphite are comprised of particles of from 5 to 20 μm in length and 0.1 to 5 μm in thickness.

10. An electrode for a fuel cell according to claim 7, wherein the thermoplastic polymer powder has a granulometry of less than 50 μm.

11. An electrode for a fuel cell according to claim 7, wherein the thermoplastic polymer is a fluorinated type.

12. An electrode for a fuel cell according to claim 11, wherein the thennoplastic polymer is PVDF.

13. An electrode for a fuel cell according to claim 7, wherein said means for enabling circulation of a gaseous fluid comprise channels.

* * * * *